United States Patent [19]

Groenhof

[11] 4,439,630

[45] Mar. 27, 1984

[54] SILICONE COMPOSITIONS FOR BURIED ELECTRICAL SPLICE CLOSURES

[75] Inventor: Eugene D. Groenhof, Freeland, Mich.

[73] Assignee: Dow Corning Corporation, Midland, Mich.

[21] Appl. No.: 261,070

[22] Filed: May 6, 1981

[51] Int. Cl.³ .................. H02G 15/24; H01B 7/00
[52] U.S. Cl. .................. 174/21 R; 174/24; 252/573; 336/94; 361/327; 524/492; 524/588; 524/730; 524/731; 556/450; 556/451
[58] Field of Search .............. 252/567, 573; 174/110 S, 137 B, DIG. 1, 21 R, 24; 336/94; 361/327; 556/450, 451; 524/492, 588, 730, 731

[56] References Cited

U.S. PATENT DOCUMENTS

| | | | |
|---|---|---|---|
| 2,945,817 | 7/1960 | Goldblum | 252/317 |
| 3,984,338 | 10/1976 | Vincent | 252/573 X |
| 4,155,864 | 5/1979 | Martin | 252/573 X |
| 4,283,592 | 8/1981 | Brownell | 174/21 R |
| 4,317,953 | 3/1982 | Brownell et al. | 174/21 R |

FOREIGN PATENT DOCUMENTS 54-22600  2/1979  Japan .................. 252/573

OTHER PUBLICATIONS

*Information About Silicone Release Agents*, Dow Corning, 1/72.
*Information About Silicone Fluids*, Dow Corning.

*Primary Examiner*—Michael R. Lusignan
*Attorney, Agent, or Firm*—James Bittell

[57] ABSTRACT

A particular silicone dielectric fluid, having aliphatic hydrocarbon or substituted aliphatic hydrocarbon substituents, with a specific gravity of at least 1.02, is employed to encapsulate and insulate an electrical cable splice. The same particular silicone dielectric fluid, with a specific gravity of at least 1.02 is also used to fill an electrical cable's conductor interstices.

19 Claims, No Drawings

SILICONE COMPOSITIONS FOR BURIED ELECTRICAL SPLICE CLOSURES

FIELD OF THE INVENTION

The invention relates to an insulated electrical cable splice employing a particular silicone dielectric fluid having aliphatic hydrocarbon or substituted aliphatic hydrocarbon substituents to encapsulate and insulate the splice. The invention also relates to an electrical cable employing a silicone dielectric fluid having aliphatic hydrocarbon or substituted aliphatic hydrocarbon substituents to fill its conductor interstices.

DESCRIPTION OF THE PRIOR ART

Electrical cable splice containers have been filled with greases, epoxies, and urethanes for the purpose of insulation. Little concern was placed on environmental factors, damage by water entry, and re-entry for maintenance and repair. It is thus an object of this invention to improve the cable splice by employing a particular silicone dielectric fluid having aliphatic hydrocarbon or substituted aliphatic hydrocarbon substituents for the purpose of insulation. This silicone fluid should cause the water to rise to the top of the container and prevent damage to the electrical cable splices. Another object of this invention is to provide a silicone fluid in which the splice can be easily removed for maintenance or repair. Further objects of the invention include providing a silicone dielectric fluid that is environmentally safe, has low toxicity, and is able to withstand extreme temperatures.

Insulated electrical cables, such as those insulated with polyethylene and cross-linked polyethylene, lose significant dielectric strength due to the formation of electrochemical trees in the insulation which may lead to premature failure of these cables. These tree-like patterns can be caused by sulfide or water attack on the insulation of the cables. The trees nucleate and grow only in the presence of conductive liquids. It is an object of this invention to provide a high dielectric strength, low dissipation factor silicone fluid, having aliphatic hydrocarbon or substituted aliphatic hydrocarbon substituents, to fill the conductor interstices of an insulated electrical cable, such as those insulated with polyethylene or cross-linked polyethylene, to prevent electrochemical treeing.

DETAILED DESCRIPTION OF THE INVENTION

This invention relates to a particular silicone dielectric fluid having aliphatic hydrocarbon or substituted aliphatic hydrocarbon substituents, with a specific gravity of at least 1.02, employed to encapsulate and insulate an electrical cable splice and to fill an electrical cable's conductor interstices.

More specifically, this invention relates to an insulated electrical cable splice employing a dielectric fluid to encapsulate and insulate the splice, the improvement comprising using a siloxane fluid having aliphatic hydrocarbon or substituted aliphatic hydrocarbon substituents, with a specific gravity of at least 1.02 as the dielectric fluid.

This invention also relates to an electrical cable comprising a plurality of conductors covered by an insulating jacket, the improvement comprising filling the interstices between the conductors with a silicone dielectric fluid having aliphatic hydrocarbon or substituted aliphatic hydrocarbon substituents having a specific gravity of at least 1.02.

The dielectric fluid employed to insulate and encapsulate the splice of an electrical cable and to fill an electrical cable's conductor interstices, in accordance with this invention, can be any silicone fluid having aliphatic hydrocarbon or substituted aliphatic hydrocarbon substituents as long as the specific gravity is at least 1.02. This silicone fluid, with a specific gravity of at least 1.02, should cause water, specific gravity of 1.00, which accidentally gets into the container surrounding a splice, to rise to the top of the container and thus prevent an electrical short or damage to the electrical cable splice. Likewise, this special silicone prevents formation of harmful electrochemical trees and electrical shorts in the electrical cable. Sea water, however, has a specific gravity of 1.025, so a silicone fluid with a specific gravity of at least 1.035 would be needed in a sea water environment.

A wide variety of methods for preparing silicone fluids are well known in the art. A person of ordinary skill in the art would be capable of making the silicone fluids useful in accordance with this invention by conventional techniques, especially in view of the disclosure provided in this application.

So far as is known at this time the nature of the substituents on the silicone fluid are not critical. Thus, for example, any of the aliphatic hydrocarbon or substituted aliphatic hydrocarbon substituents normally found on the silicon atoms in silicone fluids can be present. Specific examples of suitable substituents or radicals are alkyl radicals, such as the methyl, ethyl, propyl, butyl, amyl, cyclohexyl, decyl, dodecyl, and octadecyl radicals; alkenyl radicals such as the vinyl and allyl radicals; and the corresponding substituted aliphatic radicals such as the chloropropyl, 3,3,3-trifluoropropyl, cyanobutyl, mercaptopropyl, carboxyethyl, and aminoisobutyl radicals.

The silicone dielectric fluids useful in this invention preferably have methyl substituents or all methyl substituents on the siloxane. The preferred fluids for this application are the siloxane polymers containing only methyl substituents due to the low cost thus permitting wide spread use.

Specific examples of the preferred polymethylsiloxane fluids are those comprised of monomethylsiloxane units, dimethylsiloxane units, and trimethylsiloxane units. The preferred composition being 20–25 weight percent of monomethylsiloxane units, 71–75 weight percent of dimethylsiloxane units, and 4–5 weight percent of trimethylsiloxane units.

The polymethylsiloxane fluid can also be comprised of dimethylsiloxane units and monomethylsiloxane units, with the preferred compositions being 75–85 weight percent and 15–25 weight percent, respectively.

The range of composition which constitutes a usable polymethylsiloxane fluid, composed of monomethylsiloxane units, dimethylsiloxane units, and trimethylsiloxane units, can be expressed in terms of the methyl to silicon ratio. The methyl to silicon ratio ($CH_3/Si$) should be in the range of 1.85 to 1.70. With a $CH_3/Si$ ratio above about 1.85, water will not separate to the top of the silicone fluid, and below the ratio of about 1.70, the silicone is typically a gel or resin.

Examples of other siloxane fluid copolymers useful in this invention are those composed of the siloxane units $(CH_3)_3SiO_{1/2}$, $(CH_3)_2SiO$, and either 3-chloro-2- methylpropyl(methyl)siloxane or 3-chloropropyl(methyl)siloxane units containing at least 20 mole percent of the halogenated constituent.

Though there is no real limit on the viscosity of the silicone fluid useful in this invention, a maximum viscosity of 1000 centistokes at 25° C. is preferred because the splice can then be easily removed for maintenance or repair. A viscosity of 20–500 centistokes is the most preferred because it is unique to underground electrical cables for the purpose of easy removal of the splice for maintenance or repair.

A silicone fluid having aliphatic hydrocarbon or substituted aliphatic hydrocarbon substituents, is used as a dielectric fluid to encapsulate and insulate the splice of an insulated electrical cable splice. The splice closure must protect splice bundles from damage caused by moisture, temperature extremes, and other natural forces. The closure consists of three main elements: a sturdy case, a strain relief support structure, and a silicone fluid, having aliphatic hydrocarbons or substituted aliphatic hydrocarbon substituents, used as a natural encapsulant. The silicone dielectric fluid is funneled, injected, or pressurized into the closure for immediate encapsulation.

A silicone fluid, having aliphatic hydrocarbons or substituted aliphatic hydrocarbon substituents, is used to fill the conductor interstices of an electrical cable. The fluid would be introduced to the cable system by migrating through conductor interstices, and would use the splice box as a replenishable reservoir. The fluid could also be introduced to the cable system by funneling, pressurizing or injecting it into the system. This method could be used to prevent electrochemical treeing in electrical cables, such as polyethylene and cross-linked polyethylene. Electrochemical treeing is caused by water and sulfide attack.

In order that those skilled in the art may better understand how the present invention can be practiced, the following examples are given by way of illustration and not by way of limitation. All of the viscosity and specific gravity measurements were taken at 25° C. unless otherwise stated.

EXAMPLE 1

Into a 5 liter, 3-necked flask equipped with a mechanical stirrer, thermometer, addition funnel, and reflux condenser attached to a dry ice cooled condenser which was attached to a dry ice cold trap was placed
109 grams (1.0 moles) $(CH_3)_3SiCl$,
1935 grams (15.0 moles) $(CH_3)_2SiCl_2$,
681 grams (4.56 moles) $CH_3SiCl_3$, and 998 grams of heptane.

The addition funnel contained 403 grams (22.4 moles) of water. This was dropped into the stirring chlorosilane solution over a 3 hour period while maintaining the pot temperature at 25°±10° C. by heating as necessary.

The contents of the cold trap were then returned to the flask and stirring was continued for one hour while warming the mixture to 60° C.

One liter of distilled water was then mixed into the fluid and the mixture was separated in a separatory funnel. The organic layer was washed six more times with 500 ml portions of distilled water.

The fluid was then placed into a flask that had a Dean Stark trap attached to it and the product was azeotroped dry.

At a pot temperature of 150° C., the solvent was distilled from the products. At this point the hydrolyzate had a specific gravity of 0.991 and a viscosity of 18 centistokes.

To the hydrolyzate, 15 grams of Filtrol 20 (an acid activated adsorbent, Filtrol Corp.) was added, and the mixture was stirred and heated to 120° C. for 3 hours. The mixture was then allowed to cool overnight.

For 30 minutes, the fluid was stirred with 7 grams of $NaHCO_3$ and 15 grams of Super-Cel (one of a series of Celite Filter Aids made of exceptionally pure diatomaceous silica, Johns-Manville Sales Corp.). The slurry was then pressure filtered.

At this time, the filtrate had a specific gravity of 1.016 and a viscosity of 51 cs.

The filtrate was then placed in a 2 liter, 3-necked flask and stripped using a pear head to a pot temperature of 240° C. and a head temperature of 140° C. at 20 mm Hg.

A viscosity of 91 cs and a specific gravity of 1.028 was obtained.

Since the above fluid showed a high hydroxyl content and a low flash point, it was heated with 1 percent Filtrol for 2 hours at 120° C. As the product cooled below 70° C., it was stirred with ½ percent MgO, and then slurried with 1 percent Super-Cel. The mixture was then filtered and stripped to 260° C. at 20 mm Hg. The pot residue was stirred with a little Nuchar (an activated carbon characterized by its exceptionally high porosity which results in a very high adsorptive capacity, West Virginia Pulp and Paper Co., Industrial Chemical Sales Div.) and Super-Cel and filtered.

The viscosity was 95±2 cs and the specific gravity was 1.026±0.005. The silicone fluid was comprised of about 24.99 weight percent monomethylsiloxane units, about 71.01 weight percent dimethylsiloxane units, and about 4.00 weight percent of trimethylsiloxane units. The methyl to silicon ratio was 1.79 to 1.00.

EXAMPLE 2

A dielectric fluid composed of phenylmethylpolysiloxane, having a specific gravity of 1.065 and a viscosity of 125 cs, was placed in a cable splice system consisting of a sturdy case and a strain relief support structure. The fluid was then tested for water penetration, material compatibility, functional model, and actual field trial.

The water penetration tests, tested according to ASTM D 1533, are performed using 50 percent water and 50 percent insulating fluid. The fluid is removed using a separatory funnel, and its electrical characteristics such as dielectric constant ($D_k$), dissipation factor ($D_f$), and volume resistivity ($V_r$), tested according to ASTM D 924, are checked for degradation over a 64 day period.

The Material Compatibility Tests were performed using all known materials associated with the splice case. The fluid compatibility tests were run at 100° F. for 48 hrs. The aqueous reagents used were 0.1 N (1.06 percent by weight) $Na_2CO_3$, 0.2 N NaOH, 5 percent by weight $HC_2H_3O_2$, 5 percent by weight NaCl, 3 percent by volume $H_2SO_4$, and fuel oil. 20.0 grams of the siloxane and 5.0 grams of the aqueous reagent were weighed into 1 oz. glass vials and capped. These were shaken vigorously and placed in an air circulating oven controlled at 100° F. The bottles were shaken again at 16 hours and 24 hours. The samples were removed from the oven after 48 hours, centrifuged, and examined. None of the samples were gelled or significantly changed.

The functional model test was performed where cables were terminated in water and fluid and sealed in test tubes. The resistance of adjoining conductors were measured using a 1000 volt potential difference between conductors. The deterioration in conductor to conductor and conductor to ground resistance was noted with time. Basically, this tested both fluid electrical properties and material compatibility with time in the same set up.

The field tests were performed using actual splice cases buried in ditches which were flooded with water. Electrical resistance of the conductor pairs were recorded. The test results are:

| Days | Water Penetration | $D_k$ | $D_f$ | $V_r$ |
|---|---|---|---|---|
| Control | .02% | 2.88 | .00024 | $1.1 \times 10^{14}$ ohm-cm |
| 4 | .03% | 2.88 | .00048 | $.6 \times 10^{14}$ ohm-cm |
| 8 | .05% | 2.88 | .00121 | $1.0 \times 10^{14}$ ohm-cm |
| 16 | .05% | 2.89 | .00024 | $.29 \times 10^{14}$ ohm-cm |

In conclusion, the fluid shows little deterioration with exposure to large amounts of water over long time periods.

EXAMPLE 3

A dielectric fluid composed of 21 weight percent monomethylsiloxane units, 71 weight percent dimethylsiloxane units, and 4 weight percent trimethylsiloxane units, having a specific gravity of 1.03 and a viscosity of 95 cs, was placed in a cable splice system consisting of a sturdy case and a strain relief support structure. The fluid was then tested (following the procedure of Example 2) for water penetration, material compatibility, functional model, and actual field trial. The test results are:

| Days | Water Penetration | $D_k$ | $D_f$ | $V_r$ |
|---|---|---|---|---|
| control | .04 | 2.51 | .0012 | $2.1 \times 10^{13}$ ohm-cm |
| 8 | .12 | 2.85 | .00064 | $1.6 \times 10^{13}$ ohm-cm |
| 32 | .15 | 2.85 | .00063 | $.52 \times 10^{13}$ ohm-cm |

In conclusion, the fluid shows little deterioration with exposure to large amounts of water over long time periods, and none of the samples were gelled or significantly changed in the compatibility tests.

That which is claimed is:

1. In an insulated electrical cable splice employing a dielectric fluid to encapsulate and insulate the splice, the improvement comprising using a silicone fluid having aliphatic hydrocarbon or substituted aliphatic hydrocarbon substituents, with a maximum viscosity of 1000 cs., and with a specific gravity of at least 1.02 as the dielectric fluid.

2. An insulated electrical cable splice as defined in claim 1 wherein the silicone fluid has a viscosity range of 20-500 cs.

3. An insulated electrical cable splice as defined in claim 2, wherein the silicone fluid is a polymethylsiloxane.

4. An insulated electrical cable splice as defined in claim 3, wherein the polymethylsiloxane fluid is comprised of monomethylsiloxane units, dimethylsiloxane units, and trimethylsiloxane units.

5. An insulated electrical cable splice as defined in claim 4 wherein the polymethylsiloxane fluid is comprised of 20-25 weight percent of monomethylsiloxane units, 71-75 weight percent of dimethylsiloxane units, and 4-5 weight percent of trimethylsiloxane units.

6. An insulated electrical cable splice as defined in claim 3, wherein the polymethylsiloxane fluid is comprised of dimethylsiloxane units and monomethylsiloxane units.

7. An insulated electrical cable splice as defined in claim 6, wherein the polymethylsiloxane fluid is comprised of 15-25 weight percent of monomethylsiloxane units and 75-85 weight percent of dimethylsiloxane units.

8. An insulated electrical cable splice as defined in claim 4, wherein the methyl to silicon ratio of the silicone fluid is in the range of 1.70 to 1.85.

9. An insulated electrical cable splice as defined in claims 1, 2, 3, 4, 5, 6, 7 or 8 wherein the silicone fluid has a specific gravity of at least 1.02.

10. In an electrical cable comprising a plurality of conductors covered by an insulating jacket, the improvement comprising filling the interstices between the conductors with a silicone dielectric fluid having aliphatic hydrocarbon or substituted aliphatic hydrocarbon substituents and having a specific gravity of at least 1.02.

11. An electrical cable as defined in claim 10 wherein the silicone fluid has a maximum viscosity of 1000 cs.

12. An electrical cable as defined in claim 11 wherein the silicone fluid has a viscosity range of 20-500 cs.

13. An electrical cable as defined in claim 12, wherein the silicone fluid is a polymethylsiloxane.

14. An electrical cable as defined in claim 13, wherein the polymethylsiloxane is comprised of monomethylsiloxane units, dimethylsiloxane units, and trimethylsiloxane units.

15. An electrical cable as defined in claim 14, wherein the polymethylsiloxane is comprised of 20-25 weight percent of monomethylsiloxane units, 71-75 weight percent of dimethylsiloxane units, and 4-5 weight percent of trimethylsiloxane units.

16. An electrical cable as defined in claim 13, wherein the polymethylsiloxane is comprised of dimethylsiloxane units and monomethylsiloxane units.

17. An electrical cable as defined in claim 16, wherein the polymethylsiloxane is comprised of 15-25 weight percent of monomethylsiloxane units and 75-85 weight percent of dimethylsiloxane units.

18. An electrical cable as defined in claim 14, wherein the methyl to silicon ratio of the silicone fluid is in the range of 1.70 to 1.85.

19. An electrical cable as defined in claims 10, 11, 12, 13, 14, 15, 16, 17, or 18 wherein the silicone fluid has a specific gravity of at least 1.035.

* * * * *

UNITED STATES PATENT AND TRADEMARK OFFICE
CERTIFICATE OF CORRECTION

PATENT NO. : 4,439,630

DATED : March 27, 1984

INVENTOR(S) : Eugene D. Groenhof

It is certified that error appears in the above-identified patent and that said Letters Patent is hereby corrected as shown below:

In column 6, line 27, "1.02" should read -- 1.035 --.

Signed and Sealed this

Fifth Day of March 1985

[SEAL]

Attest:

DONALD J. QUIGG

Attesting Officer     Acting Commissioner of Patents and Trademarks